United States Patent [19]

Zörgiebel

[11] Patent Number: 4,901,845
[45] Date of Patent: Feb. 20, 1990

[54] FRICTION ROLLER CONVEYOR

[75] Inventor: Karl H. Zörgiebel, Reichelsheim, Fed. Rep. of Germany

[73] Assignee: Carl Schneck AG, Fed. Rep. of Germany

[21] Appl. No.: 197,969

[22] Filed: May 24, 1988

[30] Foreign Application Priority Data

Jun. 9, 1987 [EP] European Pat. Off. ........ 87108282.2

[51] Int. Cl.⁴ .............................................. B65G 13/02
[52] U.S. Cl. ................................ 198/780; 198/860.3; 198/790; 244/137.1; 414/589
[58] Field of Search ............... 198/780, 860.3, 860.5, 198/790, 781, 782, 789; 244/137.1; 414/529, 530, 531, 532, 533, 534, 535

[56] References Cited

U.S. PATENT DOCUMENTS

| | | | |
|---|---|---|---|
| 1,425,499 | 8/1922 | Lewis | 198/780 X |
| 2,205,057 | 6/1940 | Brady | 414/530 X |
| 3,770,103 | 11/1973 | Ball et al. | 198/780 X |
| 4,089,399 | 5/1978 | Webb | 414/529 X |

FOREIGN PATENT DOCUMENTS

| | | | |
|---|---|---|---|
| 2353036 | 5/1974 | Fed. Rep. of Germany | 198/780 |
| 2508365 | 8/1975 | Fed. Rep. of Germany | 198/780 |
| 2805343 | 8/1979 | Fed. Rep. of Germany | 198/780 |
| 2838974 | 3/1980 | Fed. Rep. of Germany | 198/780 |
| 336424 | 2/1936 | Italy | 198/780 |

Primary Examiner—Robert J. Spar
Assistant Examiner—James R. Bidwell

[57] ABSTRACT

A friction roller conveyor includes friction rollers mounted within a housing. A housing cover has openings therein through which the friction rollers partially extend. The rollers are secured against axial shifting and are driven. The friction roller conveyor is made from easy to assemble and replace individual elements, and may be walked on and driven over without damage to the conveyor, the people or to the crossing vehicles. Repairs can be made without disassembling the entire conveyor construction.

8 Claims, 4 Drawing Sheets

FRICTION ROLLER CONVEYOR

BACKGROUND OF THE INVENTION

The present invention relates to a friction roller conveyor, and more particularly to a conveyor that includes friction rollers within a housing and a housing cover with openings through which the friction rollers partially extend and which rollers are secured against axial shifting and are driven.

German Pat. No. 3 017 942 discloses a friction roller conveyor of the above mentioned type in which slide rings are arranged on a drive shaft which are nonrotatably connected with the drive shaft. A ring surrounding the slide ring is driven by friction. In this case, the ring is driven to the slide ring and this again to the drive shaft. Such an arrangement is not only expensive but is subject to severe wear and in addition is very difficult to repair.

German Pat. No. 3 439 966 discloses a conveying device for piece goods and the like. Rolling elements, directly support the piece goods. The rolling elements are arranged below a plate or a plate-like segment on carrying, rolling drive equipment and such rolling elements run in openings in the plate. The rolling element project above the top surface of the plate and are arranged in straight rows transversely to the conveying direction. The rolling drive apparatus consists of cylindrical shafts each supported in bearings in the center under the row of rolling element as well as parallel to these rows. Such conveying devices for piece goods generally disclosed as ball conveyors have the disadvantage of high Hertzian pressure against the goods to be transported and this equipment is very expensive since it must be assured that the drive shafts are firmly connected via bearings with the plates carrying the guides for the balls. Otherwise a sliding away of the balls below the plates is possible. As a result of the high Hertzian pressure, severe wear is produced not only against the goods to be conveyed but also against the bearings for the drive shaft and the drive shaft itself. For repairs, the entire conveyor equipment must be disassembled which leads to long down times of such conveyor equipment.

SUMMARY OF THE INVENTION

With the above as background, one objective of the present invention is to provide for the assembly of a friction roller conveyor consisting of individual elements whereby it is possible to walk on and drive over the housing cover and the friction rollers without risk of damage to the conveyor, or the people walking thereon or the vehicles driven over the conveyor. Repairs can be made without disassembling an entire friction roller conveyor consisting of several elements.

By dividing the friction roller conveyor into roller conveyor elements, each with a drive shaft and loosely arranged friction rollers mounted on the shaft, and by connecting the individual roller conveyor elements together with U-shaped box sections containing the transmission elements for driving the drive shafts, and by running the friction rollers in the housing cover at the openings therein, a friction roller conveyor consisting of individual elements is provided whereby each wear component, especially the drive shafts and friction rollers can easily be removed. The friction roller conveyor can be walked on without risk since a friction roller remains stationary when stepped on while the other friction rollers continue to run. When driving over the friction roller conveyor with vehicles such as fork lift trucks, for example, the drive shaft remains unloaded since the acting forces are dissipated via the housing cover. Moreover, since the covers are clamped to the housing, simple access to the friction roller elements to be exchanged is readily available.

Guide elements in the housing cover are arranged around the friction rollers, wear of the guides when they are made of softer material than the material of the friction rollers occurs before the rollers wear, and replacement of the worn guides is easy to accomplish without having to disassemble the roller conveyor.

In a refinement of the invention, it is proposed that at least one U-shaped box section have slots at its leg flange opposite the housings for the insertion of the drive shafts. With this arrangement, easy exchangeability of a complete friction element consisting of shaft and friction rollers including the transmission devices for the drive is possible.

Another repair oriented feature device in which a firm connection between cover and drive shaft for an assured running of the friction rollers does not have to be provided.

As a result of at least one pair of rollers arranged at a distance below the drive shaft at the bottom of the housing, it is also assured that with the occurrence of too high a load on and bending of the shaft, a permanent bending of the drive shaft is prevented. The distance between at least one pair of rollers and each drive shaft is dimensioned in such a way that according to the invention, bending of the drive shaft remains in its elastic range. According to the invention, a stationary support element which also has a certain distance to the drive shaft when it is not loaded may also be provided.

The transmission of forces generated by lateral impact on the friction rollers is absorbed by the flanges of the U-shaped box sections. The forces are also absorbed by clamping of the individual covers at the housings without subjecting the bearings of the drive shafts to harmful forces.

The cover of the U-shaped box section provides protection for the entire drive against outside influences, for example, falling objects.

BRIEF DESCRIPTION OF THE DRAWINGS

Novel features and advantages of the present invention in addition to those noted above will become apparent to those of ordinary skill in the art from a reading of the following detailed description in conjunction with the accompanying drawing wherein similar reference characters refer to similar parts and in wherein.

DETAILED DESCRIPTION OF THE INVENTION

Figure 1:
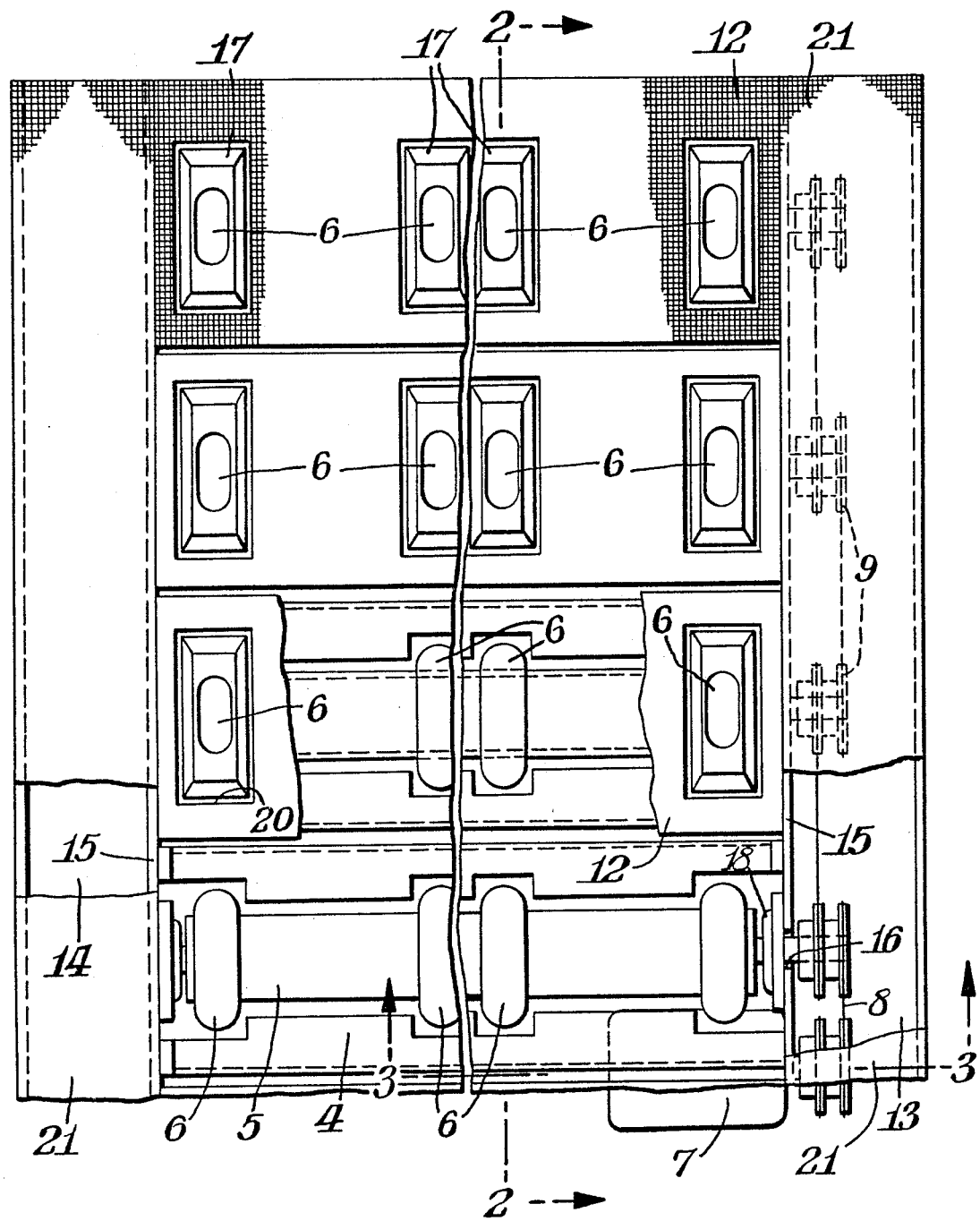
FIG. 1 is a top plan view of the friction roller conveyor of the present invention with portions broken away to show interior details.
Figure 2:
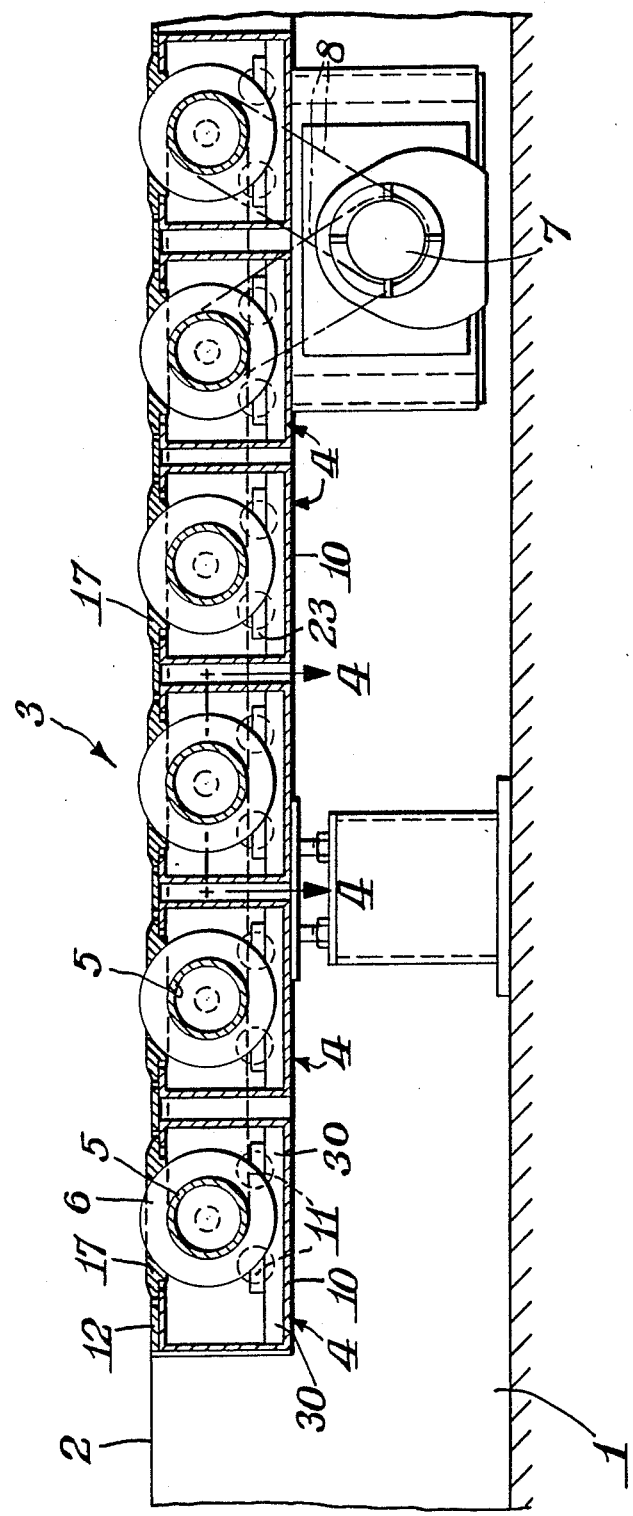
FIG. 2 is a longitudinal sectional view of the friction roller conveyor taken along the line 2—2 of FIG. 1.

Referring in more particularity to the drawing, FIGS. 1 and 2 illustrate a roller conveyor 3 disposed in a shallow Pit 1 in floor 2 constructed and arranged so that vehicles may drive along floor 2 and also over the friction roller conveyor 3 without causing damage to the conveyor or the vehicles.

Roller conveyor 3 includes housings 4 with drive shafts 5 mounted therein and with friction rollers 6 on the drive shafts. Drive shafts 5 are driven by a drive motor 7 connected to the shafts by drive chains 8 and drive chain sprockets 9.

At the bottom 10 of the housings 4, pairs of rollers 11 are arranged for supporting the drive shafts 5 when the load on conveyor 3 is excessive. When too high a load is exerted on the drive shafts 5, rollers 11 support the drive shafts 5 in such a way that only an elastic deformation of the drive shafts 5 is possible.

As shown best in FIG. 1, each drive shaft 5 with its loosely arranged friction rollers 6 is enclosed laterally and downwardly within its respective housing 4 and each housing has a cover 12. Housings 4 are arranged parallel to one another and the sides thereof are connected between spaced apart U-shaped box sections 13, 14. The inside flange 15 of at least one of the box sections 13, 14 has slots 16 therein for accommodating the drive shafts 5 which extend therethrough. U-shaped box sections 13, 14 are covered by covers 21.

The covers 12 of the housings 4 rest against the inside leg 15 of each of the U-shaped box sections 13, 14. When a vehicle drives over the friction roller conveyor 3, the produced forces are directly dissipated by the covers 12 via the friction rollers and guides 17 on the covers that surround the friction rollers 6. Worn guides are easily removed and replaced when worn.

Figure 3:
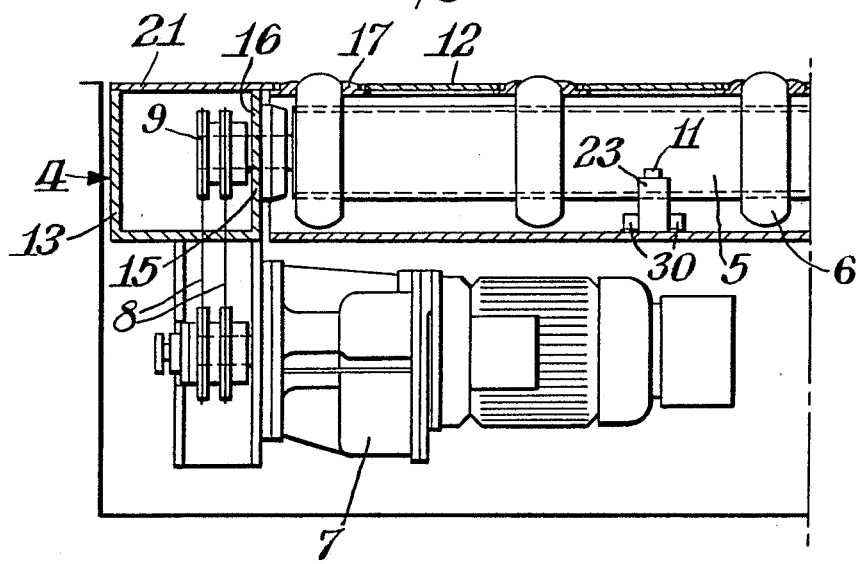
FIG. 3 is a partial sectional view taken along line 3—3 of FIG. 1.
Figure 4:
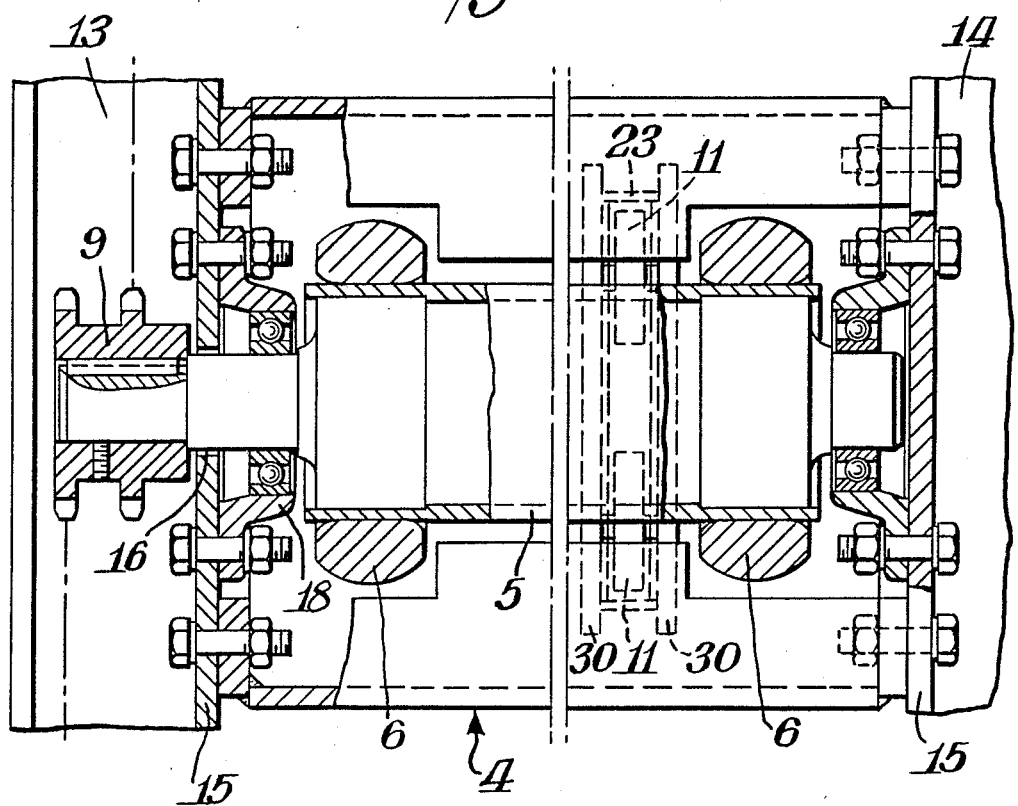
FIG. 4 is a sectional view taken along line 4—4 of FIG. 2.

FIGS. 3 and 4 illustrate on an enlarged scale the drive shaft 5 which is constructed as a hollow shaft with friction rollers 6 arranged in place on the shaft. The friction rollers 6 are freely slidable on the drive shaft 5 and are positioned by the exchangeable guides 17 of the cover 12 through which the rollers extend.

In the structure of FIGS. 3 and 4, the drive shaft 5 is supported in bearings on one side of the inside leg 15 of the box section 14 while the drive shaft 5 on the drive side thereof extends through the slot 16 of the inside leg 15 of the U-shaped box section 13. A bearing 18 of the drive shaft 5 is bolted on the inside flange 15. The drive chain sprockets 9 are located in the U-shaped box section 13. As a result of this arrangement, and by loosening the bolts on the bearing 18, the complete roller conveyor element consisting of drive shaft 5, friction rollers 6, the bearings 18 and the drive chain sprockets can be removed after the covers 12 and 21 have been removed from the housing 4.

Figure 5:
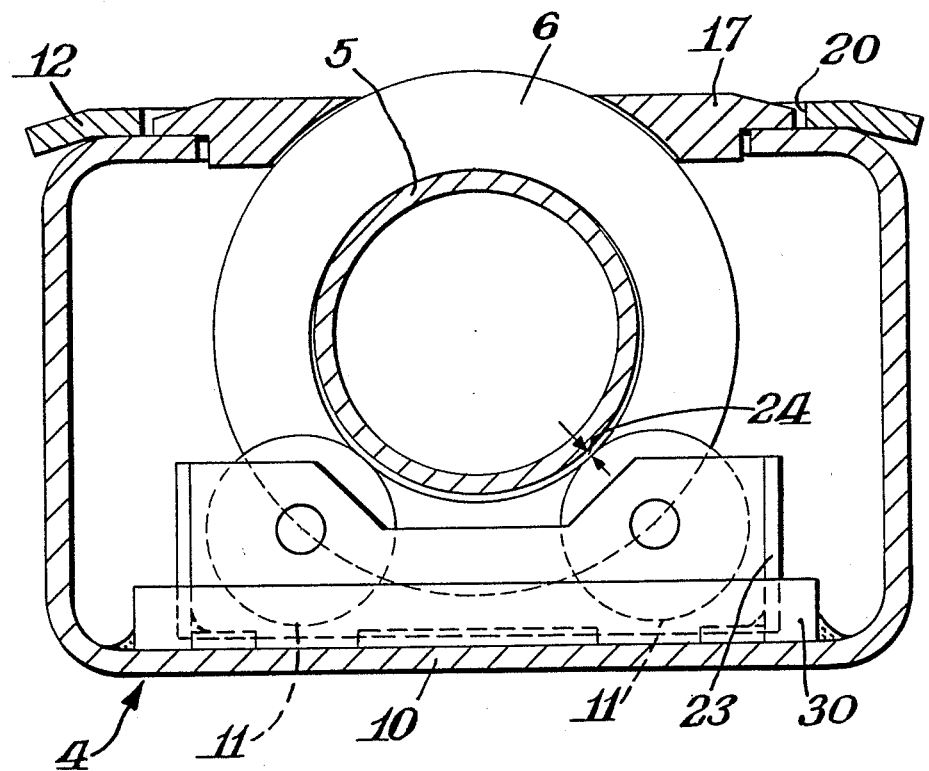
FIG. 5 is an enlarged sectional view of one of the friction rollers shown in FIG. 2 and the support structure for the drive shaft upon which the roller is mounted.

The cross section through a roller conveyor element represented on an enlarged scale in FIG. 5 shows the roller pair 11 which is arranged on a bearing support 23. The bearing support 23, according to the invention, is placed on the bottom 10 of housing 4 and is guided by two guide rails 30 which in the direction of the axis of the drive shaft are firmly connected to the housing bottom 10 in front and back of the bearing support 23. As a result of this arrangement, tolerances of the longitudinal axis of the housing 4 can be automatically evened out on the axis of the drive shaft 5. As a result of an exchangeable arrangement of the rollers 11 of the pair of rollers, stationary support elements instead of the rollers may also be used, according to the invention, which like the rollers 11 are at a distance 24 from the drive shaft.

The friction rollers 6 which, according to the invention, are constructed as crowned friction rings surround the drive shaft 5 at a distance in the lower area of the drive shaft as a result of their slightly larger diameter. The crowned design of the friction rollers 6 provides less resistance to vehicle wheels when a vehicle drives over the conveyor. Also, when pallets are transported by the conveyor, a definite forwarding in the conveying direction is guaranteed without the risk of possible damage to the bottoms of the pallets from the edges of the friction rollers. The cover plates 12 contain openings 20 near the friction rollers 6 so that the guide elements 17, as a wear component, can be readily installed and removed when worn.

Figure 6:
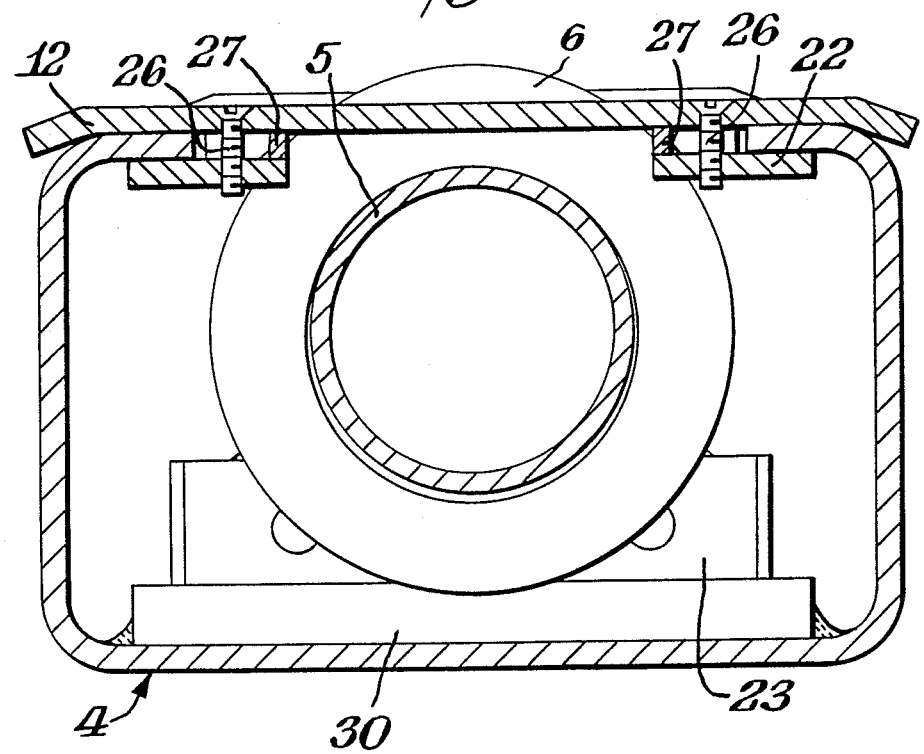
FIG. 6 is a sectional view similar to FIG. 5 but illustrating connection of the cover plate to the housings.

In the housing 4 shown on an enlarged scale in FIG. 6, the area is shown where the cover plate 12 is connected to the housing 4. This is accomplished via clamps 22 which engage behind the housing 4 by means of screws 26, on one hand, and, on the other, are supported via a bracket 27 against the cover plate 12 so that by tilting the clamps 22 by 90°, the individual cover plates 12 can be readily removed from above the individual housings 4. The worn components can then be easily exchanged.

What is claimed is:

1. A friction roller conveyor comprising at least one housing, a removable cover for the housing having spaced apart openings therein, a plurality of friction rollers mounted in the housing partially extending through the openings in the cover, a pair of opposed U-shaped box sections spaced apart and generally parallel to one another with the housing connected to and extending therebetween, a drive shaft in the housing upon which the friction rollers are loosely mounted such that they are capable of axially moving along said drive shaft, bearings secured to the U-shaped box sections rotatably supporting the drive shaft, drive means disposed in at least one of the U-shaped box sections connected to drive the drive shaft, and, replacable guide elements not fixedly attached but releasably connected to the housing cover at the periphery of the openings therein for preventing axial movement of the friction rollers on the drive shaft.

2. A friction roller conveyor as in claim 1 wherein one of the U-shaped box sections includes a slotted opening constructed and arranged to accommodate the drive shaft, the drive shaft extending through the slotted opening into that U-shaped box section for connection to the drive means.

3. A friction roller conveyor as in claim 1 wherein each of the friction rollers includes an outer peripheral surface which is crowned.

4. A friction roller conveyor as in claim 2 wherein each of the friction rollers includes an outer peripheral surface which is crowned.

5. A friction roller conveyor as in claim 2 including pairs of spaced apart support rollers mounted in the housing directly below the drive shaft and slightly spaced therefrom constructed and arranged to support the drive shaft upon slight downward deflection thereof.

6. A friction roller conveyor as in claim 3 wherein pairs of spaced apart support rollers mounted in the housing directly below the drive shaft and slightly spaced therefrom constructed and arranged to support the drive shaft upon slight downward deflection thereof.

7. A friction roller conveyor as in claim 1 wherein the cover for the housing is supported by the opposed U-shaped box sections.

8. A friction roller conveyor as in claim 1 including removable covers for the U-shaped box sections.